United States Patent
Akhtar et al.

(10) Patent No.: US 9,415,569 B2
(45) Date of Patent: Aug. 16, 2016

(54) HIGH TEMPERATURE SUBSTRATE ATTACHMENT GLASS

(71) Applicant: Robert Bosch GmbH, Stuttgart (DE)

(72) Inventors: Mohammad Masyood Akhtar, North Reading, MA (US); Samuel B. Schaevitz, Concord, MA (US); Michael C. Bradford, Reading, MA (US); Zachary Byars, Cambridge, MA (US); Joseph C. Tucker, North Andover, MA (US)

(73) Assignee: ROBERT BOSCH GMBH, Stuttgart (DE)

( * ) Notice: Subject to any disclaimer, the term of this patent is extended or adjusted under 35 U.S.C. 154(b) by 43 days.

(21) Appl. No.: 14/147,524

(22) Filed: Jan. 4, 2014

(65) Prior Publication Data

US 2014/0193643 A1 Jul. 10, 2014

Related U.S. Application Data

(60) Provisional application No. 61/749,255, filed on Jan. 4, 2013.

(51) Int. Cl.
| | | |
|---|---|---|
| *C03C 10/00* | (2006.01) | |
| *B32B 17/06* | (2006.01) | |
| *B32B 17/00* | (2006.01) | |
| *C03C 3/066* | (2006.01) | |
| *C03C 3/093* | (2006.01) | |
| *C03C 3/085* | (2006.01) | |
| *C03C 27/00* | (2006.01) | |
| *H01M 8/12* | (2016.01) | |
| *H01M 8/02* | (2016.01) | |
| *C03C 8/24* | (2006.01) | |

(52) U.S. Cl.
CPC ............. *B32B 17/06* (2013.01); *B32B 17/00* (2013.01); *C03C 3/066* (2013.01); *C03C 3/085* (2013.01); *C03C 3/093* (2013.01); *C03C 8/24* (2013.01); *H01M 8/0282* (2013.01)

(58) Field of Classification Search
None
See application file for complete search history.

(56) References Cited

U.S. PATENT DOCUMENTS

| | | | | |
|---|---|---|---|---|
| 5,453,331 | A | * | 9/1995 | Bloom ............... C03C 3/064 429/147 |
| 6,271,158 | B1 | * | 8/2001 | Xue ................. C03C 8/14 429/174 |
| 7,399,720 | B1 | * | 7/2008 | Brow et al. ............... 501/17 |
| 2005/0277541 | A1 | * | 12/2005 | Yoshii et al. ............. 501/26 |
| 2006/0019813 | A1 | * | 1/2006 | Yoshii ............ C03C 8/02 501/15 |
| 2006/0172875 | A1 | * | 8/2006 | Cortright et al. ......... 501/15 |
| 2008/0044488 | A1 | | 2/2008 | Zimmer et al. |
| 2009/0239122 | A1 | | 9/2009 | Brow et al. |
| 2009/0286664 | A1 | * | 11/2009 | Drake ............ C03C 8/02 501/15 |
| 2009/0318278 | A1 | * | 12/2009 | Mayumi ........... C03C 3/068 501/32 |
| 2009/0325349 | A1 | * | 12/2009 | Hashimoto ............. 438/127 |
| 2010/0184580 | A1 | * | 7/2010 | Liu ................. C03C 8/02 501/14 |
| 2011/0200909 | A1 | * | 8/2011 | Parihar et al. ........... 429/469 |

FOREIGN PATENT DOCUMENTS

WO    2011139751 A2    11/2011

OTHER PUBLICATIONS

International Searching Authority, International Search Report—International Application No. PCT/US2014/010263, dated Jun. 5, 2014, together with the Written Opinion of the International Searching Authority, 6 pages.

* cited by examiner

*Primary Examiner* — David Sample
(74) *Attorney, Agent, or Firm* — Norton Rose Fulbright US LLP

(57) ABSTRACT

A method of bonding a first substrate to a second substrate includes providing a glass, applying the glass in a layer between the first and second substrates to form an assembly, and heating the assembly to a bonding temperature above a glass transition temperature of the devitrifying glass, selected to cause the glass to bond the first substrate to the second substrate. The devitrifying glass has constituents that include various amounts of group A in a molar concentration of 70-95%, group B in a molar concentration of 5-20%, group C in a molar concentration of 1-20%, group D in a molar concentration of 0-6%; and group E in a molar concentration of 0-10%. The group A, B, C, D and E groups are disclosed herein.

11 Claims, 4 Drawing Sheets

HIGH TEMPERATURE SUBSTRATE ATTACHMENT GLASS

CROSS REFERENCE TO RELATED APPLICATIONS

The present application claims the benefit of U.S. Provisional Application No. 61/749,255, filed Jan. 4, 2013, the disclosure of which is incorporated by reference herein in its entirety.

TECHNICAL FIELD

The present invention relates to a family of glass compositions, more particularly to bonded assemblies using the glass to form an intermediate layer to attach two or more substrates, and most particularly to a method of forming a stack of substrates for use in a fuel cell.

BACKGROUND ART

Fuel cells produce electricity from chemical reactions. The chemical reactions typically cause a fuel, such as hydrogen, to react with oxygen to produce water vapor as a primary by-product. The hydrogen can be provided directly, in the form of hydrogen gas or liquid, or can be produced from other materials, such as hydrocarbon liquids or gasses. Fuel cell assemblies may include one or more fuel cells in a fuel cell housing that is coupled with a fuel canister containing the hydrogen and/or hydrocarbons. Fuel cell housings that are portable, coupled with fuel canisters that are portable, replaceable, and/or refillable, compete with batteries as a preferred electricity source to power a wide array of portable consumer electronics products, such as cell phones and personal digital assistants. The competitiveness of these fuel cell assemblies, when compared to batteries depends on a number of factors, including their size, efficiency, and reliability.

In a high temperature fuel cell system, such as a solid oxide fuel cell (SOFC) system, an oxidizing flow is passed through the cathode side of the fuel cell, while a reducing flow is passed through the anode side of the fuel cell. The oxidizing flow is typically air, while the reducing flow typically comprises a mixture of a hydrogen-rich gas created by reforming a hydrocarbon fuel source with an oxygen source, such as air, water vapor, or carbon dioxide. The fuel cell also has an electrolyte, which carries electrically charged particles, from one electrode to the other, and a catalyst, which speeds the reaction at the electrodes. The electrolyte plays a key role. It must permit only the appropriate ions to pass between the anode and cathode. Typically, the SOFC systems use a solid oxide or ceramic electrolytes. The fuel cell, typically operating at a temperature between 500° C. and 1000° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

The planar fuel cell design geometry is one of the typical geometries employed in fuel cells. Another typical geometry is a tubular design. A planar sandwich design can be implemented by most types of fuel cells including the SOFC systems, wherein the electrolyte is sandwiched between the anode and cathode electrodes, thereby forming a so-called membrane-electrode stack. The ceramic membranes used in SOFCs do not become electrically and ionically active until they reach very high temperatures and as a consequence the stacks have to run at temperatures ranging from 500° C. to 1000° C., as was mentioned supra. These high operating temperatures present some challenges hindering the SOFC technology. The components and interconnects in high temperature fuel cells must exhibit thermo-mechanical compatibility, their thermal expansion coefficients must match, and the materials must be tough enough and have similar enough thermo-mechanical properties to withstand mechanical stresses due to difference in thermal expansion. Furthermore, the material forming the bond between the layers in the stack must also be able to withstand the stress, temperatures and chemicals present in the fuel cell. Additionally, the process for creating such a stack must be reliable and compatible with high volume production techniques. The prior art fuel cell systems incorporate stacks that are prone to developing cracks upon thermal cycling and exhibiting thermal stress-induced failures at interconnects joining the components. Therefore, there is a need to provide a method for bonding fuel cell components, which results in fuel cell stacks that can withstand mechanical stresses upon thermal cycling and therefore can be effectively used in portable fuel cell systems that require a high-quality, long-lasting, and reliable power supply.

Glass frit materials are commonly used to bond together two substrates. Unfortunately, many glasses have very high viscosities at the desired bonding temperature, which requires excessive force to deform the intermediate frit material, and may damage portions of the substrate. Furthermore, no previously demonstrated glass material has shown the combination of required reflow temperature, chemical compatibility, melting temperature, coefficient of thermal explanation, and strength. Prior to development of the disclosed assembly, structures often had low strength, leaking, porous and low-yielding bonding.

It is an object of the present invention to provide an improved structure and method for producing an assembly of substrates mechanically attached with an intermediate glass bond layer.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
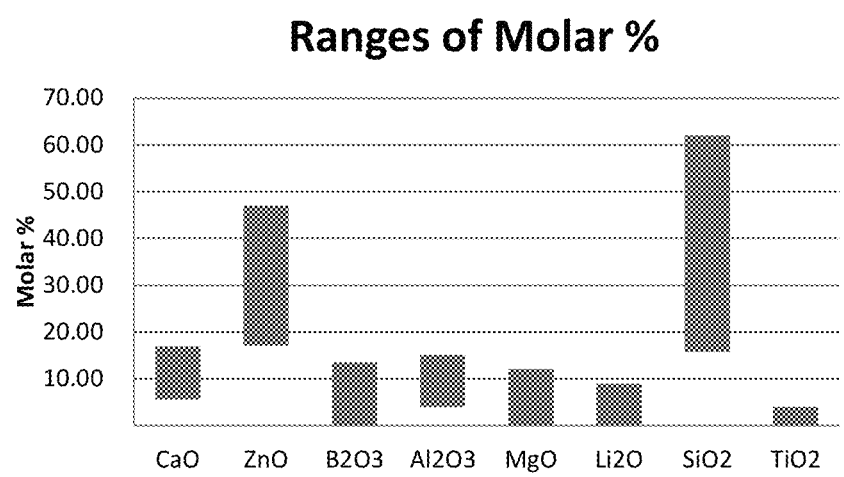
FIG. 1 is a graphical representation of the ranges of the elemental compositions shown to meet the needs of the attaching to substrates, specifically for use in a high temperature environment.

As used in this description and the accompanying claims, the following terms shall have the meanings indicated, unless the context otherwise requires:

"Percentage" of components in a glass is described in terms of the molar contribution of the individual oxide unit cell, for example moles of ZnO or $Al_2O_3$, as a percentage of the total moles of individual ingredient materials.

A "substrate" can comprise an object with a plate, cubic, rectangular, or any other geometry containing one or more substantially flat surfaces, composed of ceramic, metal, semiconductor material, or combination thereof.

"Glass frit" refers to a powdered glass material.

The "first crystallization temperature" of a glass is the lowest temperature at which the glass experiences an onset of substantial crystallization.

We have found that the prior disclosed compositions of material shown to bond substrates to one another for high temperature environments can be improved dramatically by designing a glass composition to meet the specific and demanding requirements meet by the disclosed assembly.

In particular, we have found that devitrifying glasses are particularly advantageous for these bonding applications. Devitrifying glasses are those which start in a primarily amorphous state, known as a glassy state, but which at least partially crystallize at a suitable temperature. The crystallization process serves to increase the viscosity of the glass at a given temperature as well as increase other mechanical properties such as strength and fracture toughness. Because of the increased viscosity, components bonded together with a devitrifying glass and properly crystallized can then operate at temperatures up to and even above the original bonding temperature without mechanical failure.

The amorphous glass starting material used in the bonding layer is created by melting the disclosed composition of materials. The melting process causes the components to uniformly distribute while the material is in the liquid state. The liquid is rapidly cooled to form a mostly amorphous solid. (Slow cooling of the liquid material can allow crystallization, which is undesirable prior to bonding because it increases the viscosity prematurely.) This solid can then be ground into a powder known as a frit glass. In some embodiments, a specific particle size distribution may be advantageous for bonding some substrates together. In some cases the frit glass can be sorted by particle size, enabling only select rages of particle to be used as the substrate intermediate layer. Small particles increase the surface area to mass ratio; in many cases, this has the effect of increasing the rate of solid state reactions, such as crystallization and interface bonding. With larger particles, the surface area to mass ratio is decreased, slowing reactions.

Cooling the molten glass material can be accomplished in a number of ways. In general, the molten glass is placed in contact with a cooling material. In one embodiment, the molten glass is placed into liquid water, for example by pouring into a bucket. In another embodiment, the water may be replaced by another liquid with a boiling point below the crystallization temperature of the molten glass. In other cases, it is desirable to avoid using a liquid. In some embodiments, the molten glass is placed in contact with a solid cooling substrate which is maintained below the crystallization temperature of the molten glass. In one embodiment with a solid cooling substrate, the cooling substrate is also in contact with a flow of cooling liquid to maintain the temperature below the crystallization temperature of the molten glass.

The amorphous frit glass can then be applied between a first and a second substrate to form an assembly, and then the assembly is heated to a bonding temperature where the frit glass has a low enough viscosity to flow together and bond to the substrates, forming a bonded assembly. A variety of techniques are available for applying the glass, including screen printing, tape casting, needle dispensing, and other techniques known in the art. In one embodiment, the glass is applied as a frit paste, where it is a mixture of glass frit with binding materials and solvents. In a further embodiment, the glass frit has an average particle size of between 5 and 80 microns, and a particle size distribution of between 0.5 and 100 microns. Alternatively, the devitrifying glass can be cast into a solid material and placed between the substrates. The bonding temperature is selected to be above the glass transition temperature of the devitrifying glass. Preferably the bonding temperature should be selected below the first crystallization temperature of the glass. However, with rapid heating, the bonding may occur at or above the first crystallization temperature if the rate of crystallization is sufficiently slow. Preferably, significant force is applied to compress the first substrate toward the second substrate and thereby place the frit glass under compression. The compression force increases the rate of flow and encourages densification of the frit glass and intimate contact with the substrates.

The devitrifying oxide glass is typically composed of three classes of components: formers, modifiers and intermediates. The formers typically create highly cross-linked networks providing the majority of the structure to the glass. Formers in the demonstrated glass are silicon oxide and boron oxide; however, other molecules can also act as formers depending on the remainder of the composition. Modifiers alter the network structure created by the formers. Some examples, but not a complete list, of modifiers that can alter a glass are: manganese oxide, barium, lithium oxide, sodium oxide, and potassium oxide. Modifiers are typically ions that tie up covalent bonds in the glass network by forcing an oxygen atom to hold a negative charge instead of bonding covalently, to compensate for the presence of the ion. The intermediate components such as magnesium oxide, zinc oxide and aluminum oxide can act both as formers or modifiers, creating an network structure or a interrupting the primary former chains.

In some embodiments of the devitrifying glass, in which a higher level of crystallization is desired in the final material, a fourth component, a seed, may be added. This seed is used to promote an even rate of crystallization. One non-limiting example of a seed is titanium oxide. Titanium oxide in a glass often forms distributed crystallization sites. Other elements know to act as crystallization promoters include oxides of zirconium, niobium, manganese and cerium. Additionally, a metal such as platinum can be used to promote crystallization.

Changing the molar concentration of the elements in a glass can affect many of the physical and chemical properties of a glass. Some but not all of these properties are the glass transition temperature, first crystallization temperature, coefficient of thermal expansion, and Young's modulus.

By adjusting the ratio of the glass formers, for example silicon dioxide and boron oxide, the melting temperature of a glass can be adjusted. Increasing the ratio of silicon to boron oxide can increase the melting temperature. Decreasing the ratio of silicon to boron oxide depresses the melting temperature of the glass. In the one embodiment a glass could have 15% to 65% silicon oxides and 0% to 20% boron oxides. In a preferred embodiment the glass could have 30% to 50%% silicon oxides and 0% to 10% boron oxide. In a yet more preferable embodiment, the glass has 42% to 43% silicon oxides and 4% to 5% boron oxide.

Aluminum oxide has been shown to increase the Young's modulus of a glass composition. This increase in Young's modulus increases the glass's resistance to cracking. In addition, $Al_2O_3$ improves a glass's ability to handle thermal shock, rapid heating, or cooling, key for an assembly with a large operating temperature range. Excessive aluminum oxide can increase the glass transition temperature and increase the viscosity excessively. In another embodiment, other elements that could be used in combination with or substituted for aluminum oxide, titanium oxides, zirconium oxide, yttrium or combinations thereof. In one embodiment, aluminum oxide is used composing 3% to 20% of the glass. In a preferred embodiment, aluminum oxide is 3% to 9% of the glass. In a yet more preferable embodiment, aluminum oxide is 5%-6% of the glass composition.

Zinc oxide, in some embodiments, decreases the viscosity of a glass, increasing the reflow of the glass, and in some cases increasing the glass's ability to make a seal when placed between two substrates. Excessive zinc oxide, however, can increase the crystallization rate excessively. In some embodiments, the molar concentration of zinc oxide in the glass can be between 15% and 55%, preferably 25% to 45% and more preferably 33% to 35%.

In addition to changing the chemical composition of the glass to promote flow of the intermediate glass material, pressure can be applied in opposing direction on the outer surface of the substrates. In some cases, this pressure can be applied as the intermediate layer is heated to its bonding temperature, causing the glass to flow. The pressure can help make physical contact between the substrate surfaces and the glass, promoting chemical interaction as well as physical contact.

An yet another example of how modifying the concentration of an element can tune the properties of a glass, magnesium oxide, calcium oxide, strontium oxide and barium oxide can be used to adjust the glass transition temperature of the material. Increasing or decreasing the ratio of this group of elements can increase or decrease the glass transition temperature. In a preferred embodiment magnesium oxide is used in molar concentration in the glass can be between 1% and 20%, preferably 10% to 20% and more preferably 12% to 13%. In an alternative embodiment, the concentration of magnesium oxide can be replaced by similar molar concentrations of calcium oxide, strontium oxide and barium oxide, or combinations thereof.

In a devitrified glass, in some embodiments, titanium oxide can but used to promote a uniform crystallization at the first crystallization temperature. To those skilled in the art it is known that zirconium oxides, niobium oxide, platinum, manganese oxides, cerium oxides, and combinations thereof can also be used to promote crystallization in the glass material. In a preferred embodiment, titanium oxide is used in molar concentration in the glass of between 0% and 6%, preferably 0% to 3%, and more preferably 0.5% to 1%. In an alternative embodiment, the concentration of titanium oxide can be replaced by similar molar concentrations of zirconium oxides, niobium oxide, platinum, manganese oxides, cerium oxides, and combinations thereof.

Alkaline oxide modifiers such as lithium oxide, sodium oxide and potassium oxide can be used to adjust the melting temperature of a glass in some embodiments. Molar concentrations of up to 10% can be used to balance the melting temperature of the network formers with that of the application. However, due to the high mobility of these elements and chemical compatibly issues with some possible embodiments, it is preferred that the alkaline oxide molar concentration in the glass be less than 10%, preferably less than 3%, and more preferably less than 1%.

For some applications, even 1% concentration of alkaline oxides can provide excessive reactivity and mobility at operating temperatures. For these applications, selected embodiments comprise combinations of ingredients pure to less than 1000 parts per million by weight of alkaline oxides. More preferably, ingredients used are pure to less than 100 parts per million by weight of alkaline oxides. Most preferably, ingredients used are pure to less than 10 part per million by weight of alkaline oxides. When quantifying low level contaminants, it is more practical to measure the mass of the contaminant as a fraction of the total mass or weight.

Table 1 shows the molar ratio composition of example glasses that have been made and tested to show the range of compositions that meet the specialized need of glass to bond to substrates. Specifically, the disclosed compositions are well adapted for use in bonding substrates used high temperature environments. The table shows the glass transition temperature (Tg), and the temperatures of first and second crystallization

TABLE 1

Composition and Selected Properties of Example Embodiments

| Glass ID | CaO | ZnO | B2O3 | Al2O3 | MgO | Li2O | SiO2 | TiO2 | Tg | 1st Crystal | 2st Crystal |
|---|---|---|---|---|---|---|---|---|---|---|---|
| G001 | 17 | 31 | 4 | 4 | 0 | 2 | 42 | 0 | 615 | 834 | 922 |
| G002 | 16.67 | 30.39 | 3.92 | 3.92 | 0 | 1.96 | 41.18 | 2 | 610 | 805 | 893 |
| G003 | 13.7 | 32.4 | 3.9 | 4.9 | 0 | 2 | 41.2 | 2 | 610 | 752 | 896 |
| G004 | 12.7 | 30.4 | 3.9 | 7.8 | 0 | 2 | 41.2 | 2 | 616 | 718 | 885 |
| G005 | 9.7 | 32.4 | 3.9 | 6.9 | 0 | 4 | 41.2 | 2 | 600 | 767 | 890 |
| G006 | 9.7 | 30.4 | 3.9 | 7.9 | 0 | 5 | 41.2 | 2 | 600 | 776 | 890 |
| G007 | 9.7 | 20.4 | 3.9 | 12.9 | 5 | 5 | 41.2 | 2 | 560 | 733 | 797 |
| G008 | 5.7 | 20.4 | 3.9 | 10.9 | 5 | 9 | 41.2 | 4 | 515 | 611 | 734 |
| G009 | 0 | 43.5 | 2.4 | 5.8 | 8.4 | 0 | 39 | 0.8 | 670 | 758 | 809 |
| G010 | 0 | 31.4 | 0 | 4.9 | 8.8 | 0 | 54.9 | 0 | 670 | >850 | |
| G011 | 0 | 33.9 | 4.6 | 5.9 | 12.1 | 0 | 42.6 | 0.9 | 665 | 700 | 810 |
| G012 | 0 | 33.1 | 4.5 | 5.7 | 11.9 | 2.3 | 41.6 | 0.9 | 632 | 745 | 815 |
| G013 | 0 | 24.5 | 4.3 | 5.4 | 3.4 | 0 | 62.1 | 0.3 | 707 | 780 | 820 |
| G014 | 0 | 47 | 11.9 | 15.1 | 9.5 | 0 | 15.7 | 0.7 | 623 | 712 | 834 |
| G015 | 0 | 34.6 | 7.9 | 9.8 | 6.1 | 0 | 40.7 | 0.9 | 677.9 | 757 | >850 |
| G016 | 0 | 17.1 | 13.6 | 9.3 | 5.8 | 0 | 53.3 | 0.9 | 666.5 | 697 | 769 |

In some applications, where two substrates are attached by a glass bonding layer, the effect of temperature changes on the thermal expansion of the substrates and the glass can be critical. In some applications, in which a wide operational range is desired, a mismatch in the coefficient of thermal expansion (CTE) in the materials can lead to the development of large stresses in the materials, which in some cases can result in a cohesive failure, causing a fracture and weakening in the materials, or an adhesive failure between the substrate and the glass, which in some cases could result in delamination of an assembled stack. Therefore, in many cases, it is important that the disclosed glass compositions have a CTE similar to that of the substrate to which it is attached.

In a preferred but not limiting embodiment, silicon is used as the material for the substrate (silicon has a CTE between $2.5 \times 10^{-6}$/K to $4 \times 10^{-6}$/K between 0° C. and 800° C.). In many of the disclosed embodiments, the CTE of a glass is within $5 \times 10^{-6}$/K of the substrate due to the broad range of operating temperatures targeted for the disclosed assembly. Additionally, the CTE of an amorphous glass will typically decrease as it devitrifies. This is due, in many cases, to the development of the crystal structure of the glass over time, in particular at elevated temperatures. In another non-limiting embodiment the substrate is a low CTE material (CTE between $-1 \times 10^{-6}$/K to $3 \times 10^{-6}$/K between 0° C. and 800° C.). To give one example, Corning Vycor has a CTE that varies from 0 to $0.75 \times 10^{-6}$/K between 0° C. and 800° C. In yet a further non-limiting embodiment the substrate could be an alumina silicate with a CTE $4 \times 10^{-6}$/K and $8 \times 10^{-6}$/K between 0° C. and 800° C. Consequently, it is important that the CTE range exhibited by a glass over a range of crystalline states be suitably matched to the substrate.

In all embodiments, it is critical that the glass adheres to the substrate. Adhesion of the glass composition to the substrate occurs as the glass reacts with the interfacial microstructure of the substrate. This bonding process occurs more quickly at temperatures at or above the glass transition temperature. As discussed previously, the composition of the glass affects the glass transition temperature, and thus the temperature at which the glass will attach, and will remain attached, to a substrate.

A preferred glass for the attachment of two substrates contains:
silicon oxides in a molar percent of 30-50%;
boron oxides in a molar percent of 0-10%;
zinc oxides in a molar percent of 25-45%;
aluminum oxides in a molar percent of 3-15%;
titanium oxides in a molar percent of 0-3%;
magnesium oxides in a molar percent of 10-20%;
Silicon, boron and zinc oxides are the formers for the main glass structure. The boron and magnesium oxides are used to depress the glass transition temperature of the former networks. Aluminum oxides provide resistance to thermal shock. Titanium oxides promote crystallization at reduced temperatures.

A further preferred embodiment contains approximately:
42-43% silicon oxides
33-35% zinc oxides
4-5% boron oxides
5-6% aluminum oxides
12-13% magnesium oxides
0.5-1% titanium oxides
These specific levels of boron and magnesium depress the glass transition temperature to around 665 C, allowing bonding to occur between 700 and 800° C. Titanium oxides promote crystallization beginning around 700° C., allowing high strength to form at the same temperatures as bonding occurs.

A yet another preferred glass for the attachment of two substrates contains:
silicon oxides in a molar percent of 37.5-50%;
boron oxides in a molar percent of 0-10%;
zinc oxides in a molar percent of 25-35%;
aluminum oxides in a molar percent of 3-15%;
titanium oxides in a molar percent of 0-3%;
magnesium oxides in a molar percent of 10-20%;
Silicon, boron and zinc oxides are the formers for the main glass structure. The boron and magnesium oxides are used to depress the glass transition temperature of the former networks. Aluminum oxides provide resistance to thermal shock. Titanium oxides promote crystallization at reduced temperatures. The absences of alkaline as a main component is important of the use in sealing applications disclosed above.

An example glass for the attachment of two substrates with a CTE less than that of silicon, such as amorphous quarts, contains approximately:
41-42% silicon oxides
32-34% zinc oxides
4-5% boron oxides
5-6% aluminum oxides
11.5-12.5% magnesium oxides
2-3% lithium oxides
0.5-1% titanium oxides
Silicon, boron and zinc oxides are the formers for the main glass structure. The boron and magnesium oxides depresses the glass transition temperature of the former networks to around 635 C. Aluminum oxides provide resistance to thermal shock. Titanium oxides promote crystallization at around 700° C. Lithium oxides depress the CTE of the glass, $1-3 \times 10^{-6}$/K and also lower the glass transition temperature of the composition.

An example glass for the attachment of two substrates with a CTE greater than that of silicon, such as alumina ceramic plates, contains approximately:
41-42% silicon oxides
32-34% zinc oxides
4-5% boron oxides
5-6% aluminum oxides
11.5-12.5% magnesium oxides
2-3% sodium
0.5-1% titanium oxides
Silicon, boron and zinc oxides are the formers for the main glass structure. The boron and magnesium oxides depresses the glass transition temperature of the former networks. Aluminum oxides provide resistance to thermal shock. Titanium oxides promote crystallization at around 700° C. Sodium increases the CTE of the glass, $5-8 \times 10^{-6}$/K.

An example glass for the attachment of two substrates with a CTE greater than that of silicon, such as alumina ceramic plates, contains approximately:
41-42% silicon oxides
32-34% zinc oxides
4-5% boron oxides
5-6% aluminum oxides
11.5-12.5% magnesium oxides
2-3% potassium
0.5-1% titanium oxides
Silicon, boron and zinc oxides are the formers for the main glass structure. The boron and magnesium oxides depresses the glass transition temperature of the former networks. Aluminum oxides provide resistance to thermal shock. Titanium oxides promote crystallization at around 700° C. Potassium increases the CTE of the glass, $5\text{-}8\times10^{-6}/K$.

An example glass which shows slower crystallization, which allows for extended bonding time and flexibility during early operation, contains approximately.
54-56% silicon oxides
32% zinc oxides
4-6% aluminum oxides
8-9% magnesium oxides
Silicon, boron and zinc oxides are the formers for the main glass structure. The magnesium oxides depresses the glass transition temperature of the former networks to 670° C. Aluminum oxides provide resistance to thermal shock. The lack of any seed retards crystallization below temperatures of 850° C.

An example glass which allows for bonding of substrates at temperatures above 560° C., and is suitable for application that do exceed 700° C. contains approximately.
41% silicon oxides
20.5% zinc oxides
11% aluminum oxides
5% magnesium oxides
9% lithium oxides
4% titanium oxides
Silicon, boron and zinc oxides are the formers for the main glass structure. The magnesium and calcium oxides depresses the glass transition temperature of the former networks and with the addition of the lithium oxides move glass transition to 515 C. Aluminum oxides provide resistance to thermal shock. The titanium seed strongly promotes crystallization at temperatures of 611 C.

A another preferred glass for the attachment of two substrates contains:
silicon oxides in a molar percent of 40-55%;
boron oxides in a molar percent of 0-10%;
zinc oxides in a molar percent of 30-40%;
aluminum oxides in a molar percent of 3-15%;
titanium oxides in a molar percent of 0-3%;
magnesium oxides in a molar percent of 10-20%;
Silicon, boron and zinc oxides are the formers for the main glass structure and has an increased glass transition and sealing temperature due to higher level of silicon oxides. The boron and magnesium oxides are used to depress the glass transition temperature of the former networks. Aluminum oxides provide resistance to thermal shock. Titanium oxides promote crystallization at reduced temperatures.

A another preferred glass for the attachment of two substrates contains in the lower end of the disclosed ranges of silicon oxides:
silicon oxides in a molar percent of 25-40%;
boron oxides in a molar percent of 0-10%;
zinc oxides in a molar percent of 25-45%;
aluminum oxides in a molar percent of 3-15%;
titanium oxides in a molar percent of 0-3%;
magnesium oxides in a molar percent of 10-20%;
Silicon, boron and zinc oxides are the formers for the main glass structure and has a decreased glass transition and sealing temperature due to the lower level of silicon oxides. The boron and magnesium oxides are used to depress the glass transition temperature of the former networks. Aluminum oxides provides resistance to thermal shock. Titanium oxides promote crystallization at reduced temperatures.

A another preferred glass for the attachment of two substrates that experience very rapid thermal shock contains:
silicon oxides in a molar percent of 30-50%;
boron oxides in a molar percent of 0-10%;
zinc oxides in a molar percent of 25-45%;
aluminum oxides in a molar percent of 9-15%;
titanium oxides in a molar percent of 0-3%;
magnesium oxides in a molar percent of 10-20%;
Silicon, boron and zinc oxides are the formers for the main glass structure. The boron and magnesium oxides are used to depress the glass transition temperature of the former networks. Aluminum oxides in the higher end of the disclosed range provide resistance to thermal shock. Titanium oxides promote crystallization.

A another preferred glass for the attachment of two substrates with a slow crystallization rate extending bonding time contains:
silicon oxides in a molar percent of 30-50%;
boron oxides in a molar percent of 0-10%;
zinc oxides in a molar percent of 25-45%;
aluminum oxides in a molar percent of 3-15%;
titanium oxides in a molar percent of 0-0.5%;
magnesium oxides in a molar percent of 10-20%;
Silicon, boron and zinc oxides are the formers for the main glass structure. The boron and magnesium oxides are used to depress the glass transition temperature of the former networks. Aluminum oxides resistance to extreme thermal shock. Titanium oxides in the lower end of the disclosed range promote crystallization at reduced temperatures.

A another preferred glass in the disclosed range for the attachment of two substrates with a fast crystallization rate contains:
silicon oxides in a molar percent of 30-50%;
boron oxides in a molar percent of 0-10%;
zinc oxides in a molar percent of 25-45%;
aluminum oxides in a molar percent of 3-15%;
titanium oxides in a molar percent of 2-3%;
magnesium oxides in a molar percent of 10-20%;
Silicon, boron and zinc oxides are the formers for the main glass structure. The boron and magnesium oxides are used to depress the glass transition temperature of the former networks. Aluminum oxides provide resistance to thermal shock. Titanium oxides promote rapid crystallization at reduced temperatures.

A another preferred glass in the disclosed range for the attachment of two substrates:
silicon oxides in a molar percent of 45-60%;
boron oxides in a molar percent of 8-18%;
zinc oxides in a molar percent of 13-25%;
aluminum oxides in a molar percent of 6-15%;
titanium oxides in a molar percent of 0-3%;
magnesium oxides in a molar percent of 3-12%;
Silicon, boron, zinc, aluminum and magnesium oxides are balanced as formers for the main glass structure, where silicon is increased in proportion to zinc. The boron and magnesium oxides are used to depress the glass transition temperature as well as behave as former in glass networks. Aluminum oxides in the higher end of the disclosed range provide resistance to extreme thermal shock. Titanium oxides promote crystallization at reduced temperatures.

A another preferred glass in the disclosed range for the attachment of two substrates that contains:
silicon oxides in a molar percent of 11-25%;
boron oxides in a molar percent of 7-18%;
zinc oxides in a molar percent of 13-25%;
aluminum oxides in a molar percent of 10-20%;
titanium oxides in a molar percent of 0-3%;

magnesium oxides in a molar percent of 6-14%;

Silicon, boron, zinc, aluminum and magnesium oxides are balanced as formers for the main glass structure with for silicon on the lower end of the disclosed range in proportion to zinc. The boron and magnesium oxides are used to depress the glass transition temperature as well as behave as former in glass networks. Aluminum oxides provide resistance to extreme thermal shock. Titanium oxides promote crystallization at reduced temperatures.

A another preferred glass in the disclosed ranges for the attachment of two silicon substrates with a CTE closely matched to silicon without the use of lithium oxides with a slow crystallization rate contains:

silicon oxides in a molar percent of 35-50%;
zinc oxides in a molar percent of 25-38%;
aluminum oxides in a molar percent of 3-18%;
magnesium oxides in molar percents of 8-17%

Silicon, and zinc oxides are balanced as formers for the main glass structure. The magnesium and aluminum oxides are used to depress the glass transition temperature of the glass networks. Aluminum oxides increase resistance to thermal shock. The slow crystallization and high silicon concentration gives this example mixture a CTE of about $3 \times 10^{-6}$/K to $4 \times 10^{-6}$/K between 0° C. and 800° C.

A another preferred glass in the disclosed range for the attachment of two substrates without boron oxides, to achieve the disclosed properties contains:

silicon oxides in a molar percent of 32-39%;
zinc oxides in a molar percent of 30-41%;
aluminum oxides in a molar percent of 8-19%;
titanium oxides in a molar percent of 1.5-4%;

Silicon, and zinc oxides are balanced as formers for the main glass structure. Aluminum oxides increase resistance to thermal shock. These disclosed ranges produce a CTE of around $5 \times 10^{-6}$/K to $6 \times 10^{-6}$/K between 0° C. and 800° C. Titanium oxides promote crystallization at reduced temperatures.

A another preferred glass in the disclosed range for the attachment of two substrates where the glass has a CTE of around $6 \times 10^{-6}$/K to $8 \times 10^{-6}$/K between 0° C. and 800° C.:

silicon oxides in a molar percent of 23-46%;
zinc oxides in a molar percent of 22-35%;
aluminum oxides in a molar percent of 5-13%;
boron oxides in molar percent of 6-19%
titanium oxides in a molar percent of 0.5-3%;

Silicon, and zinc oxides are balanced as formers for the main glass structure. Aluminum oxides increase resistance to thermal shock. These ranges produce a CTE of around $6 \times 10^{-6}$/K to $8 \times 10^{-6}$/K between 0° C. and 800° C. due to the presence of boron and crystallization from the Titanium oxides at reduced temperatures.

A another preferred glass in the disclosed range for the attachment of two substrates where calcium oxide is used to replace magnesium to achieve the disclosed properties:

silicon oxides in a molar percent of 25-45%;
boron oxides in a molar percent of 5-15%;
zinc oxides in a molar percent of 32-48%;
aluminum oxides in a molar percent of 1-12%;
titanium oxides in a molar percent of 0-2%;
calcium oxides in a molar percent of 3-13%;

Silicon, boron, and zinc oxides are balanced as formers for the main glass structure. The boron and calcium oxides are used to depress the glass transition temperature as well as behave as former in glass networks. Aluminum oxides in the higher end of the disclosed range provide resistance to extreme thermal shock. Titanium oxides promote crystallization at reduced temperatures.

A another preferred glass in the disclosed range for the attachment of two substrates where strontium oxide is used to replace magnesium to achieve the disclosed properties:

silicon oxides in a molar percent of 35-45%;
boron oxides in a molar percent of 2-13%;
zinc oxides in a molar percent of 36-46%;
aluminum oxides in a molar percent of 1-11%;
titanium oxides in a molar percent of 0-4%;
strontium oxides in a molar percent of 3-10%;

Silicon, boron, and zinc oxides are balanced as formers for the main glass structure. The boron and strontium oxides are used to depress the glass transition temperature of the glass networks. Aluminum oxides increase resistance to thermal shock. Titanium oxides promote crystallization at reduced temperatures.

A another preferred glass in the disclosed range for the attachment of two substrates where barium oxide is used to replace magnesium to achieve the disclosed properties:

silicon oxides in a molar percent of 23-42%;
boron oxides in a molar percent of 2-11%;
zinc oxides in a molar percent of 32-46%;
aluminum oxides in a molar percent of 1-15%;
titanium oxides in a molar percent of 0-4%;
barium oxides in a molar percent of 6-16%;
magnesium oxides in a molar percentage of 0-5%;

Silicon, boron, and zinc oxides are balanced as formers for the main glass structure. The boron and barium oxides are used to depress the glass transition temperature of the glass networks. Aluminum oxides increase resistance to thermal shock. Titanium oxides promote crystallization at reduced temperatures.

A another preferred glass in the disclosed range for the attachment of two substrates where zirconium oxide is used to replace magnesium to achieve the disclosed properties:

silicon oxides in a molar percent of 25-45%;
boron oxides in a molar percent of 7-23%;
zinc oxides in a molar percent of 20-38%;
aluminum oxides in a molar percent of 1-12%;
titanium oxides in a molar percent of 0-2%;
zirconium oxides in a molar percent of 6-21%;

Silicon, boron, and zinc oxides are balanced as formers for the main glass structure. The boron and barium oxides are used to depress the glass transition temperature of the glass networks. Aluminum oxides increase resistance to thermal shock. Titanium oxides promote crystallization at reduced temperatures.

A another preferred glass in the disclosed range for the attachment of two substrates where magnesium is removed and the glass systems is balanced with boron, zinc and aluminum oxides as transition element to achieve the disclosed properties:

silicon oxides in a molar percent of 28-55%;
boron oxides in a molar percent of 2-20%;
zinc oxides in a molar percent of 30-41%;
aluminum oxides in a molar percent of 3-21%;
titanium oxides in a molar percent of 0-4%;

Silicon, boron, and zinc oxides are balanced as formers for the main glass structure. The boron oxides are used to depress the glass transition temperature of the glass networks. Aluminum oxides increase resistance to thermal shock. Titanium oxides promote crystallization at reduced temperatures.

FIG. 1 is a graphical representation of the ranges of the elemental compositions shown to meet the needs of the attaching to substrates, specifically for use in a high temperature environment.

Figure 2:
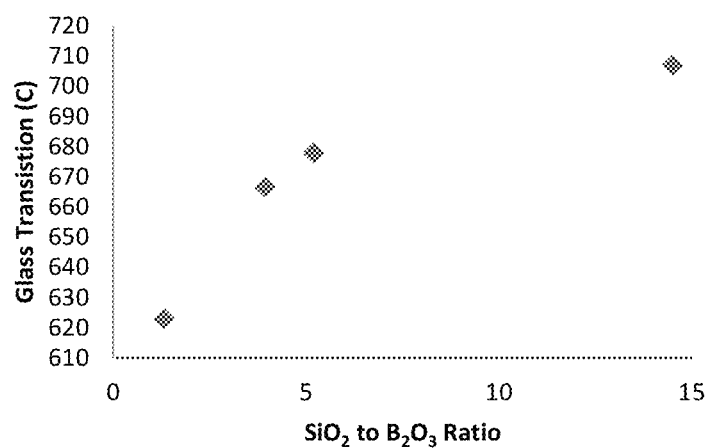
FIG. 2 shows an example of an effect of the ratio of $B_2O_3$ to $SiO_2$ in the glass composition in example glasses G013-G016. Glass G014 has a glass transition temperature of 623° C. with a $SiO_2$ to $B_2O_3$ molar ratio 1.32. By increasing the ratio of $SiO_2$ to $B_2O_3$ in glass G013 to 14.4 the glass transition temperature increased to 707 C. The intermediate ratio in examples G015 and G016 give intermediate glass transition temperatures.

FIG. 2 shows an example of an effect of the concentration of $B_2O_3$ to $SiO_2$ glass G014 has a glass transition temperature of 623° C. with a boron to silicon ratio 1.32. By changing the molar concentration of $SiO_2$ to $B_2O_3$ in glass G013 to a ratio of 14.5 the glass transitions temperature increased to 707° C.

Glass transitions temperature can be strongly effect by the addition of small amounts of alkalide to the composition. In Table 1, G011 and G012 are very similar with the exception of 2% lithium oxide. In this embodiment the addition of lithium oxide depressed the glass transition temperature from 665° C. to 632° C.

Figure 3A:
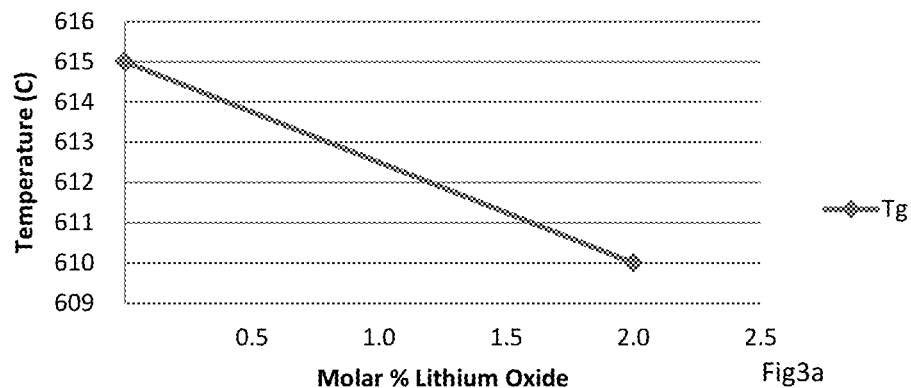
FIG. 3A shows the effect of the addition of $TiO_2$ on the Tg of the glass examples G001 and G002.
Figure 3B:
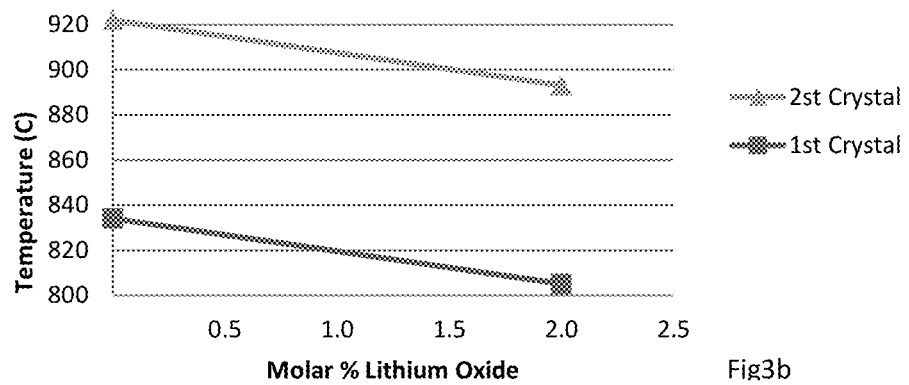
FIG. 3B shows the effect of the same change on the first and second crystallization temperatures of the examples.

FIGS. 3A and 3B show the effect of the addition of a seed element such as titanium oxide to the glass composition. In G001, the composition has a first crystallization temperature of 834° C. The addition of 2% titanium oxide in G002 lowers this crystallization temperature to 805° C. while causing a minimal 5° C. decrease to the glass transition temperature.

Figure 4:
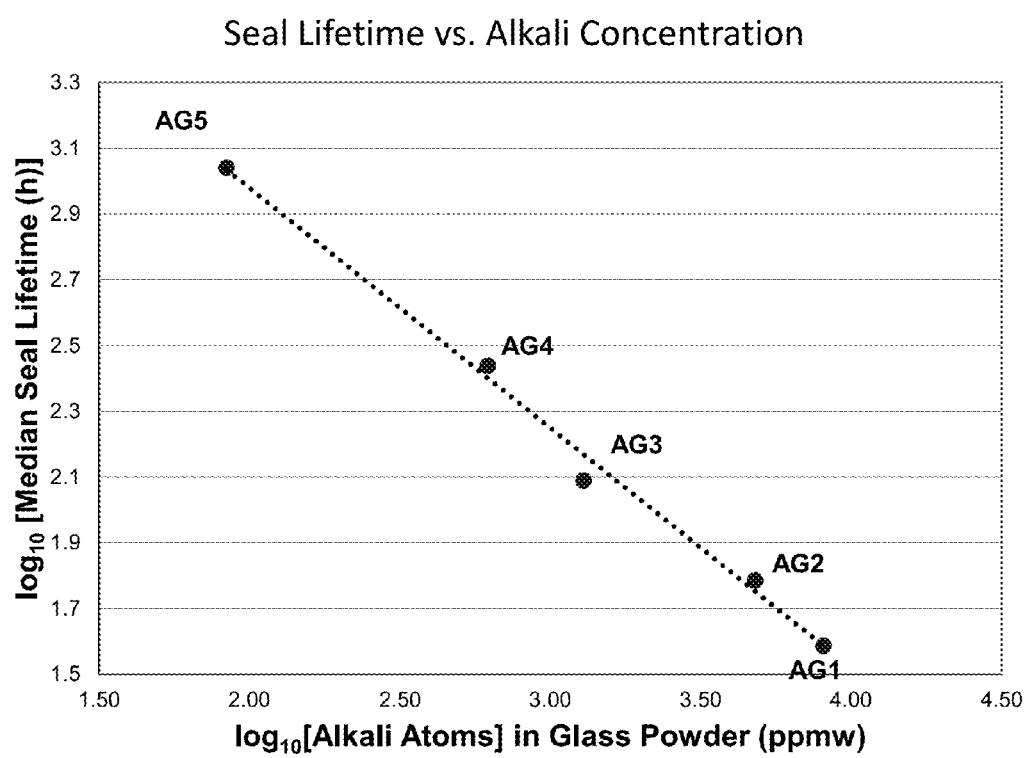
FIG. 4 shows the effect of alkaline oxides in a glass in part per million by weight on the lifetime of a hermetic seal at temperatures above 650° C. In an example application where the bonding of two substrates is performed to achieve a hermetic boundary, decrease in alkaline increases the seal lifetime at temperature.

FIG. 4 shows the effect of alkaline oxides in a glass in part per million by weight on the lifetime of a hermetic seal at temperatures above 650° C. In an example application where the bonding of two substrates is performed to achieve a hermetic boundary, decrease in alkaline increases the seal lifetime at temperature.

The embodiments of the invention described above are intended to be merely exemplary; numerous variations and modifications will be apparent to those skilled in the art. All such variations and modifications are intended to be within the scope of the present invention as defined in any appended claims. For example, although some features may be included in some embodiments and drawings and not in others, these features may be combined with any of the other features in accordance with embodiments of the invention as would be readily apparent to those skilled in the art based on the teachings herein.

What is claimed is:

1. A bonded stack assembly for a solid oxide fuel system that withstands high temperatures, comprising:
    a first substrate;
    a second substrate;
    a glass, disposed between the two substrates and establishing a bond between the substrates, the glass comprising:
        group A in a molar concentration of 70-95%;
        group B in a molar concentration of 5-20%;
        group C in a molar concentration of 1-20%;
        group D in a molar concentration of 0-6%; and
        group E in a molar concentration of 0-10%;
    wherein:
        group A is selected from the group consisting of:
            silicon oxides in a molar percent of 15-65%;
            boron oxides in a molar percent of 0-20%;
            zinc oxides in a molar percent of 15-55%; and
            combinations thereof;
        group B is selected from the group consisting of:
            aluminum oxides in a molar percent of 3-20%;
            titanium oxides in a molar percent of 5-20%;
            zirconium oxide in a molar percent of 5-20%;
            yttrium oxide in a molar percent of 5-20%; and
            combinations thereof;
        group C is selected from the group consisting of:
            magnesium oxides in a molar percent of 1-20%;
            calcium oxides in a molar percent of 1-20%;
            strontium oxides in a molar percent of 1-20%;
            barium oxides in a molar percent of 1-20%; and
            combinations thereof;
        group D is selected the from the group consisting of:
            titanium oxides in a molar percent of 0-6%;
            zirconium oxides in a molar percent of 0-6%;
            niobium oxides in a molar percent of 0-6%;
            platinum in a molar percent of 0-6%;
            manganese oxides in a molar percent of 0-6%;
            cerium oxides in a molar percent of 0-6%; and
            combinations thereof;
        group E is selected from the group consisting of:
            lithium oxide in a molar percent of 0-10%;
            sodium oxide in a molar percent of 0-10%;
            potassium oxide in a molar percent of 0-10%; and
            combinations thereof;
        wherein the glass has constituents comprising:
            silicon oxides in a molar percent of 30-50%;
            boron oxides in a molar percent of 0-10%;
            zinc oxides in a molar percent of 25-35%;
            aluminum oxides in a molar percent of 3-15%;
            titanium oxides in a molar percent of 0.5-3%;
            magnesium oxides in a molar percent of 10-20%; and
        and the foregoing percentages are expressed in relation to the glass composition as a whole.

2. The bonded assembly of claim 1, wherein the glass has constituents targeting a molar percentage comprising:
    silicon oxides in a molar percent of 42-43%;
    boron oxides in a molar percent of 4-5%;
    zinc oxides in a molar percent of 33-35%;
    aluminum oxides in a molar percent of 5-6%;
    titanium oxides in a molar percent of 0.5-1%;
    magnesium oxides in a molar percent of 12-13%; and
    and the foregoing percentages are expressed in relation to the glass composition as a whole.

3. The bonded assembly of claim 1, wherein one or both substrates are silicon.

4. The bonded assembly of claim 1, wherein the glass is a devitrifying glass.

5. The bonded assembly of claim 1, wherein the bond between the first substrate and the second substrate is a hermetic seal between the substrates.

6. The bonded assembly of claim 1, wherein composition is as the glass component in a frit paste.

7. The bonded assembly of claim 6, wherein the average glass particle size is between 5 um and 80 um.

8. The bonded assembly of claim 7, wherein the frit has a size distribution in the range between 0.5 um and 100 um.

9. The bonded assembly of claim 1, wherein the bonding glass has a glass transition temperature between 550° C. and 800° C., and a crystallization temperature between 50° C. and 200° C. greater than the transition temperature.

10. The bonded assembly of claim 1, wherein the glass is a devitrifying glass, wherein the bond between the first substrate and the second substrate is a hermetic seal between the substrates, wherein composition is as the glass component in a frit paste, wherein the average glass particle size is between 5 um and 80 um, wherein the frit has a size distribution in the range between 0.5 um and 100 um.

11. The bonded assembly of claim 10, wherein the bonding glass has a glass transition temperature between 550° C. and 800° C., and a crystallization temperature between 50° C. and 200° C. greater than the transition temperature.

* * * * *